June 15, 1965 W. BECKER 3,189,264
VACUUM PUMP DRIVE AND SEAL ARRANGEMENT
Filed June 4, 1963 4 Sheets-Sheet 1

INVENTOR.
WILLI BECKER
BY
Cromwell, Greist & Warden
Attys.

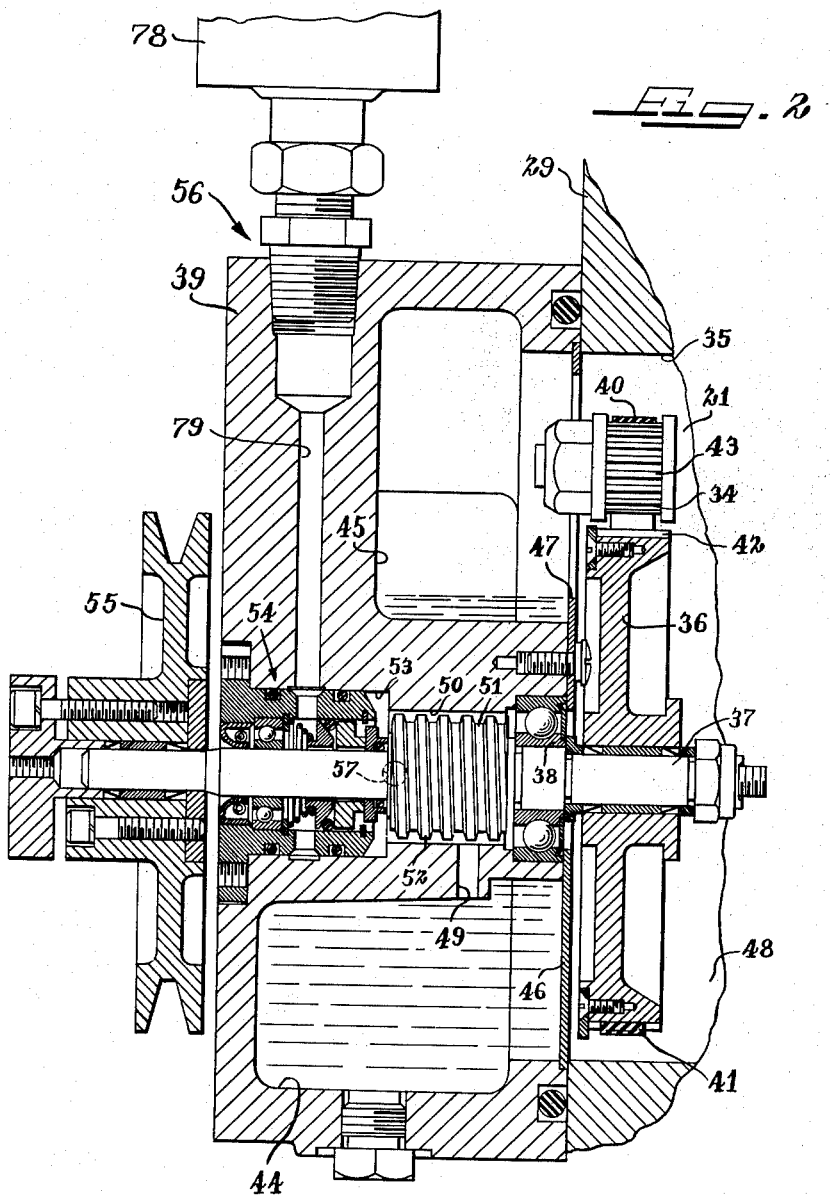

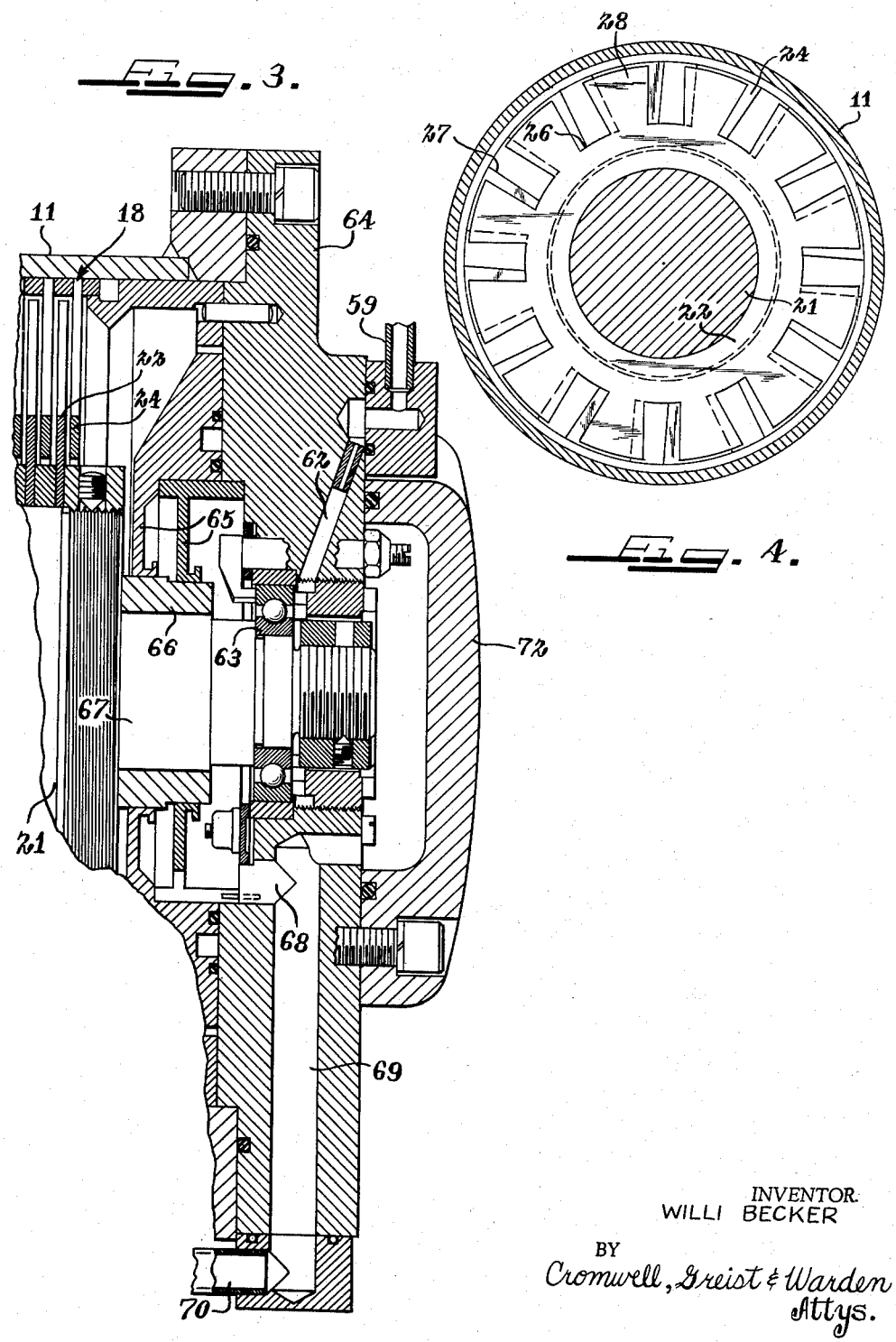

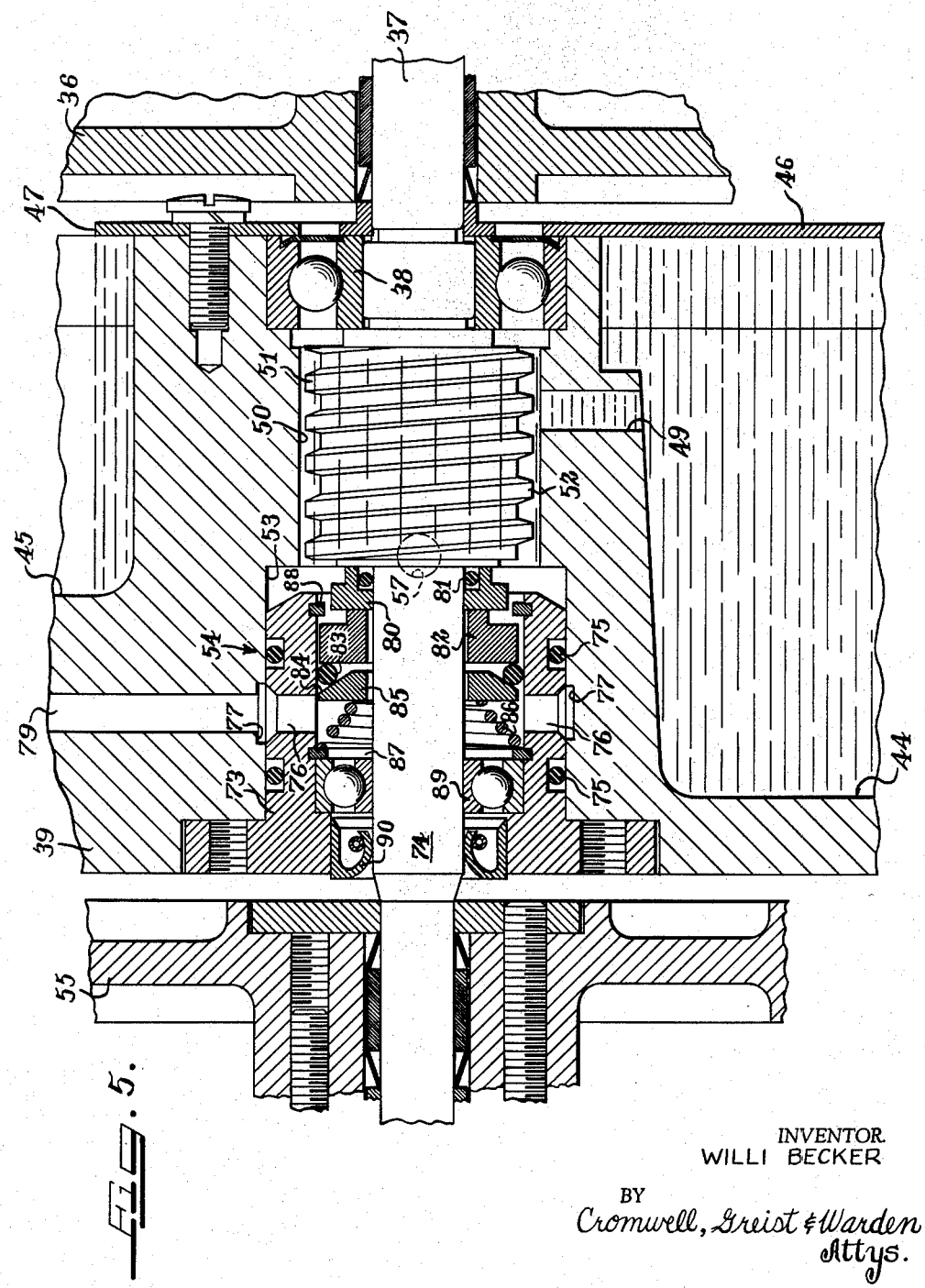

United States Patent Office 3,189,264
Patented June 15, 1965

3,189,264
VACUUM PUMP DRIVE AND SEAL ARRANGEMENT
Willi Becker, Ehringshausen, Kreis Wetzlar, Germany, assignor to Arthur Pfeiffer Company (G.m.b.H.), Wetzlar, Germany, a corporation of Germany
Filed June 4, 1963, Ser. No. 285,362
5 Claims. (Cl. 230—207)

The invention is directed to a special form of combination drive and seal arrangement providing for new and improved results in the establishing and maintaining of an effective seal between areas of differential pressure. More specifically, the drive and seal arrangement of the invention especially adapted for use with a vacuum system involving as a part thereof a vacuum pump which is operated by the drive arrangement and which is effectively sealed from external pressure gradient conditions by the seal arrangement. The arrangement of the invention, by way of example only, has particularly utility in the use thereof with a molecular pump of the type disclosed in my United States Patent 2,918,208, issued December 22, 1959.

The operation of moving parts in a system having areas of differential pressure sealed from one another gives rise to a difficult problem of maintaining an adequate pressure gradient seal between the areas with relation to operating means extending therebetween. For example, an evacuation system involves the use of a vacuum pump with the rotor thereof being driven by a rotating shaft extending from the interior of the pump through the housing thereof to suitable drive means externally of the pump. Under such conditions the rotating drive shaft must be adequately sealed so as to prevent leakage of atmospheric pressure therealong into the pump, such leakage adversely affecting the efficiency of the pump. This problem is particularly acute with regard to the use of a molecular pump of the type disclosed in my aforementioned patent as such a pump is intended to be effective to establish extremely high vacuum conditions in the free molecular range. This means that such a pump is intended to establish a flow of relatively free and scattered gas molecules from the system undergoing evacuation to a preliminary vacuum discharge system. This type of molecular pump may have a discharge pressure of approximately 10 microns, for example, and this pressure may be made up of a lubricant vapor pressure of 9.9 microns and an actual air pressure of about 0.1 micron. Under such extremely high vacuum conditions the pressure gradient or differential between opposite ends of the pump drive shaft is of course very substantial, such as being based on the difference between atmospheric pressure and the aforementioned pump discharge pressure.

It is an object of the present invention to provide a new and improved sealing arrangement for the operating means of a sealed system.

A further object is to provide a new and improved drive and seal arrangement for use in a sealed system to maintain pressure differential separation during operation of the systm.

Another object is to provide new and improved vacuum pump including as a part thereof a special lubricant pumping sealing arrangement forming a part of the drive of the vacuum pump.

Still a further object is to provide new and improved means for sealing the operating shaft of a vacuum pump, the means including lubricant pumping means supplied by lubricant from the specially arranged and functioning lubricant sump means, the lubricant moved by the pumping means establishing and maintaining an effective seal between areas of pressure differential along the shaft.

An additional object is to provide a new and improved vacuum pump having as a part thereof a specially arranged lubricant sump maintained in gas-free condition, the sump being arranged relative to the drive shaft of the pump to supply lubricant to a pumping rotor portion of the shaft for auxiliary sealing of the shaft against atmospheric pressure, this sealing action being supplemented by specially arranged mechanical sealing means and further preferably including lubricant static pressure means functioning with the shaft and sealing means to provide a secondary sealing action.

Other objects not specifically set forth will become apparent from the following detailed description of the invention made in conjunction with the accompanying drawings wherein:

FIG. 2 is an enlarged fragmentary section of the drive and seal arrangement of the pump of FIG. 1;

FIG. 3 is an enlarged fragmentary section of an end bearing arrangement of the pump;

FIG. 4 is a transverse section of the pump cavity taken generally along line 4—4 of FIG. 1; and FIG. 5 is an enlarged fragmentary section of the operating shaft pumping and sealing arrangement constituting a part of the invention.

Figure 1:
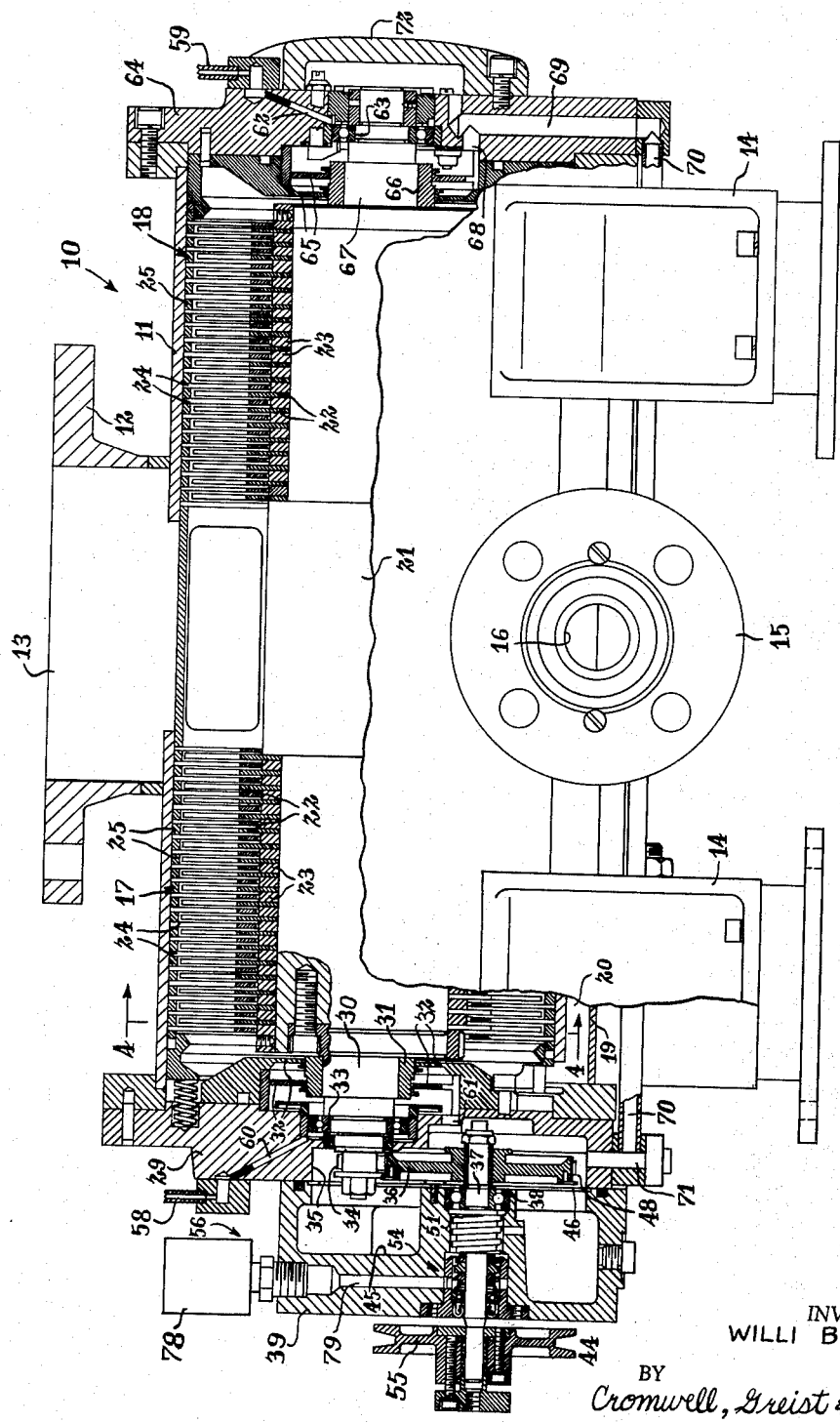
FIG. 1 is a fragmentary, partly sectioned elevation of a molecular pump including as a part thereof the new and improved drive and seal arrangement of the invention.

The preferred form of the invention involves the provision of lubricant pumping means on the rotating drive shaft of a sealed sytsem, especially a vacuum pump. The pumping means is supplied with lubricant from a specially arranged sump which is subjected to the pressure conditions of the system or vacuum pump and which is arranged relative to the pumping means to provide for a continuous flow of lubricant thereto in response to gravity induced action. The lubricant moved by the pumping means is operative in a direction along the shaft toward the higher pressure condition, such as an atmospheric pressure condition existing externally of the vacuum pump. The lubricant is moved at sufficient force over a controlled distance to counteract the external greater pressure and prevent leakage along the shaft into the system or vacuum pump. Preferably, the lubricant moved by the pumping means cooperatively functions with mechancal sealing means positioned about the shaft between the pumping means and the exterior of the system, such cooperation providing for the relieving of sealing pressure operation of the sealing means. Still further, the shaft sealing arrangement is preferably augmented by liquid head static pressure means in communication with the shaft and sealed therealong by the aforementioned sealing means and capable of maintaining an adequate seal in the static condition of the shaft and pumping means. While the embodiment of the invention to be described herein deals with the use of the invention in a vacuum pump, it will be understood that the invention is not limited solely to such use.

FIG. 1 illustrates a pump 10 which is capable of operation in the free molecular range in accordance with the basic principles disclosed in my aforementioned patent. The pump 10 includes a main cylindrical stator or housing 11 having attached thereto a flanged fitting 12 defining a centrally located inlet 13, the fitting 12 being adapted for connection to a system undergoing evacuation. A plurality of depending flanged supports 14 form a part of the housing 11 for use in maintaining the pump in proper upright condition and for attaching the pump to any suitable surface. The lower central portion of the pump includes a flanged outlet fitting 15 projecting from a side area thereof and having an outlet port 16 for communication with suitable discharge means, such as a preliminary vacuum system for use in the known manner.

The housing 11 defines a sleeve-like cylindrical stator the interior of which constitutes a stator cavity having received therein a gas moving rotor assembly which is operative to move molecules through the pump from the inlet 13 to the outlet 16. In the form of the pump illustrated, two pumping stages 17 and 18 are provided with the inlet 13 being located between the same to cooperate with each of the stages and a discharge manifold 19 communicating the opposite outer discharge ends of the stages with the discharge port 16 below the stator 11. In this respect the discharge manifold 19 is mounted about the lower portion of the housing 11 in suitably attached sealed relation therewith and provides a longitudinal passage 20 for the movement of gas from opposite outer discharge ends of the pumping stages 17 and 18 into the discharge port 16.

Centrally and longitudinally of the housing 11 is a continuous rotor shaft 21 which mounts thereabout along opposite ends thereof in each of the pumping stages 17 and 18 a plurality of impellor discs or rings 22 maintained in longitudinally spaced relation by spacer rings 23. The housing 11 along the inner surface thereof in each of the pumping stages 17 and 18 has fixed thereto a plurality of longitudinally spaced annular stator discs or rings 24 which are maintained in spaced relation by spacer rings 25 located therebetween. The impellor rings 22 and stator rings 24 are arranged in longitudinally spaced overlapping relation and are alternately staggered.

FIG. 4 illustrates the impellor and stator rings as including a plurality of circumferentially arranged recesses 26 and 27, respectively, the recesses 26 defining therebetween a plurality of vane-like members 28 which rotate with the shaft 21 relative to the adjacent stator rings 24. As illustrated, the recesses 26 of each impellor ring may be wider at the bases thereof to impart a wedge-like shape to the vane members 28. The particular forms of impellor and stator rings illustrated do not constitute a part of the present invention and are merely examples of a suitable combination of elements providing a gas moving means adapted for use in an evacuation system. However, these particular forms of impellor and stator rings have been found especially useful in the movement of molecules in the free molecular range. The vane members 28 of course rotate with the shaft 21 across the recesses 27 of adjacent fixed stator rings 24, the recesses 27 being located immediately adjacent the inner surface of the housing 11. Gas molecules are impelled by the rotating rings and the periodic alignment of recesses of the rotating and fixed rings provides for molecular movement in a controlled manner longitudinally of the stages 17 and 18 from the center inlet portion of the pump to the outer opposite end discharge portions of the pump, the discharge portions being in communication with the manifold discharge passage 20.

The outer discharge end portion of the pumping stage 17 as shown in FIG. 1 includes an annular end member 29 suitably secured to the housing 11. A projecting reduced end portion 30 of the rotor shaft 21 receives thereabout a fixed bearing sleeve 31 having arranged in running engagement with the outer surface thereof a plurality of known type of centrifugal oil catchers 32 which are fixed to the end member 29. The outer end of the rotor shaft 21 is suitably supported in a bearing 33 and has fixed thereto a drive pinion 34. The drive pinion 34 projects into a central opening 35 in the end member 29 and is located directly above a drive pulley or gearing means 36 which in turn is fixed to the inner end of a drive shaft 37 suitably journaled through a bearing 38 mounted in a transmission housing 39 which is suitably fixed to the end member 29 outwardly thereof.

FIG. 2 best illustrates the principle components of the shaft mounting arrangement in the transmission housing 39. The innermost end of the drive shaft 37 is suitably fixed to the pulley 36, this pulley in the form illustrated being meshed with a drive tooth belt 40 which in turn is meshed with the pinion gear 34 of the rotor shaft 21. The belt 40 includes a plurality of inner surface teeth 41 which mesh with outer surface pulley teeth 42 and also mesh with pinion teeth 43. While any suitable gearing means may be utilized, the type of teeth normally formed in a tooth belt drive arrangement are generally rectilinear and such teeth in connection with the operational aspects of the drive arrangement of the present invention perform the additional function of delivering lubricant above the drive shaft 37 in a manner to be described.

The transmission housing 39 is formed with an annular sump cavity surrounding the portion of the housing which receives the shaft 37. The sump cavity includes a lower arcuate portion 44 located directly below the shaft 37, and an upper arcuate portion 45 located directly above the shaft 37. The cavity portion 44 is closed along the inner surface thereof by an annular disc-like plate 46 which is centrally apertured to receive the shaft 37 therethrough. Lubricant completely fills the cavity portion 44. The upper sump cavity portion 45 may be filled with lubricant to any desired extent as controlled by the dimension of an aperture 47 formed in the plate 46 above the shaft 37. FIG. 2 illustrates the aperture 47 being of a limited dimension to permit the plate 46 to maintain a sufficient quantity of lubricant in the cavity portions 44 and 45 to completely surround the shaft mounting area. An additional lubricant collection sump portion 48 is located in the end member 29 immediately outwardly of the closure plate 46 in the bottom end portion of the pump.

The sump portion 48 is located to provide for immersion of the lower portion of the pulley 36 in collected lubricant with the intermeshing teeth 42 of the pulley 36 and teeth 41 of the belt 40 functioning to lift lubricant upwardly from the sump portion 48 for splashing thereof into the upper sump cavity portion 45 through the plate aperture 47 to maintain the proper level of lubricant. This arrangement also provides for proper and continuous lubrication of the pulley, belt and pinion gear.

In this manner the annular sump surrounding the portion of the transmission housing mounting the drive shaft 37 is constantly supplied with lubricant to maintain the same adequately filled as controlled by the location and dimension of the aperture 47 of the closure plate 46. The lubricant sump through the aperture 47 in the closure plate 46 is at all times subject to the vacuum conditions created by the pump 10, such vacuum conditions at the discharge end of the adjacent pumping stage 17 for example being on the order of 10 microns. The head of lubricant maintained relative to the shaft 37 provides for lubricant delivery through a suitable port 49 into an enlarged shaft housing area 50 of the transmission housing 39 through which the shaft 37 extends. The arrangement described provides for gravity induced delivery of lubricant through the port 49, the supply of lubricant being maintained under vacuum conditions preventing the occlusion of gas therein which might interfere with the sealing action to be described. The lubricant sump arrangement is also maintained out of direct communication with the adjacent pumping stage 17 thus preventing introduction of lubricant therein to an extent that efficient pumping action may be adversely affected.

Outwardly of the bearing 38 and within the area 50 of the transmission housing 39, the drive shaft 37 is provided with an enlarged pump rotor 51 having formed about the outer periphery thereof a spiraling continuous pumping vane 52 which is in the form of a stub tooth. The lubricant delivered into the area 50 through the port 49 is continuously moved by the screw-type pumping action of the rotor 51 in a direction outwardly of the transmission housing 39 along the shaft 37 to counteract and seal against the higher external atmospheric pressure. The pressure of lubricant pumped in this manner should be at least equal to the pressure against which it is used as a seal.

Outwardly of the area 50 the transmission housing 39 is provided with an enlarged area 53 in which is mounted a sealing arrangement generally designated in FIG. 2 by the numeral 54. A reduced portion of the shaft 37 extends through the sealing arrangement 54 and projects outwardly from the outer face of the transmission housing 39 and has suitably fixedly secured thereto a drive pulley 55 adapted to be driven by a belt (not shown) engaged with a suitable power source such as an A.C. electric motor or the like. A lubricant standpipe arrangement 56 is also carried by the transmission housing 39 and cooperates with the sealing arrangement 54 to provide for a static seal when the pump rotor 51 is not in operation.

The basic drive arrangement described may be used to provide for a 5 to 1 gearing ratio to rotate the rotor shaft 21 and attached impellor plates 22 at a high speed such as on the order of 16,000 r.p.m. The drive shaft under such conditions would be operated at approximately 3,000 r.p.m. The particular arrangement of the drive gearing as mentioned above prevents delivery or leakage of lubricant into the stator housing 11. This is accomplished by the location of the drive elements below the rotor shaft 21 and the driving of the shaft at the discharge end of one of the pumping stages. This gearing arrangement not only provides for proper rotor shaft speed but permits more efficient sealing of the drive shaft 37 under materially reduced rotational speed conditions.

The maintaining of the lubricant sump under vacuum conditions can ordinarily raise the serious problem of cavitation insofar as efficient operation of the pump rotor 51 is concerned. However, this problem is completely eliminated in the design described by reason of the location of the sump relative to the drive shaft to provide for pressure head gravity induced feed of lubricant to the pump rotor 51. By way of example, the level of lubricant above the pump rotor 51 of the shaft 37 may be on the order of approximately 2 inches to establish an adequate hydrostatic gradient to permit adequate lubricant feed and prevent cavitation.

An additional advantage arising from the use of the shaft pumping means involving the rotor 51 is the providing for the circulation of lubricant throughout the various parts of the vacuum pump 10 which require lubrication for proper functioning. FIG. 2 illustrates a port 57 located in the area 50 of the transmission housing 39 adjacent the discharge end of the pump rotor 51 to receive lubricant from the area 50 during movement thereof by the rotor 51. The port 57 is attached to suitable internal passages (not shown) to supply lubricant to the connections 58 and 59 at opposite ends of the pump 10 as shown in FIG. 1. The connection 58 is in communication with a passage 60 extending through the end member 29 and into communication with the bearing 33 for proper lubrication thereof in rotational support of the shaft rotor 21. Lubricant delivered to the bearing 33 is denied entry into the adjacent pumping stage 17 by the centrifugal catchers 32. The catchers 32 deflect the lubricant downwardly to cause flow thereof through a port 61 adjacent the pulley 36. Lubricant flows downwardly into the sump portion 48 previously described from which it is picked up by the pulley and belt and delivered in sufficient quantities to the sump cavity portion 45.

Lubricant delivered through the connection 59 at the opposite end of the pump 10 flows through a passage 62 for lubrication of the opposite end bearing 63 of the rotor shaft 21 as best shown in FIG. 3. The opposite end of the housing 11 includes an end assembly 64 suitably attached thereto and carrying a plurality of radially extending centrifugal catcher elements 65 which surround a bearing sleeve 66 carried on a reduced end portion 67 of the rotor shaft 21. Lubricant from the bearing 63 is denied entry into the pumping stage 18 by the catchers 65 and flows downwardly through a port 68 into a vertical passage 69 from which it is delivered to a longitudinal passage 70 extending the length of the pump 10 adjacent the discharge manifold 19. FIG. 1 illustrates the opposite end of the lubricant return passage 70 being in communication with a vertical passage 71 which in turn delivers lubricant into the sump portion 48 for ultimate recirculation by the pump rotor 51 as previously described. The opposite end bearing assembly of the pump 10 is basically completed by the provision of an end cover plate 72 which carries the connection 59.

FIG. 5 best illustrates the sealing arrangement forming a part of the vacuum pump drive. The enlarged area 53 of the transmission housing 39 through which the shaft 37 extends has received therein an annular plug-like sleeve insert 73 surrounding a reduced end portion 74 of the shaft 37 received in the area 53. Suitable O-rings 75 seal the sleeve 73 in the housing area 53, the sleeve being formed with a plurality of circumferentially spaced ports 76 aligned with an annular groove 77 formed in the area 53. As best shown in FIG. 2, the standpipe assembly 56 includes a container 78 storing lubricant therein and located externally of the transmission housing 39. The container is in communication with a passage 79 extending vertically downwardly through the transmission housing and in communication with the annular groove 77. In this manner a constant static head of lubricant is applied to the sealing arrangement 54 centrally thereof, the lubricant being made readily available to the ports 76 by reason of communication of the annular groove 77 therewith.

The sealing arrangement 54 includes an end face mating ring 80 fixed to the shaft portion 74 and sealed thereto by an O-ring 81. The mating ring 80 rotates with the shaft portion 74 and is maintained in running end face sealing engagement with a sealing ring 82 received about the shaft portion 74. An O-ring 83 is in engagement with the outer face of the sealing ring 82 and rides along an inclined surface 84 of a pressure ring 85 which has the outer face thereof engaged by a conical spring 86 seated at its outer end against a lock ring 87 fixed in the sleeve 73. A lock ring 88 fixed in the sleeve 73 prevents separation of the assembly described from the sleeve 73 and provides for preliminary sub-assembling thereof before insertion of the sleeve 73 in its operative position within the transmission housing 39. The lock ring 87 also holds in place a bearing 89 supporting the shaft portion 74 within the sleeve 73. An external radial lip seal member 90 is fixed in the sleeve 73 and engages the shaft portion 74.

During operation of the shaft 37, the pumping rotor 51 delivers lubricant under pressure axially outwardly along the shaft 37 opposed to atmospheric pressure. Lubricant is pumped from the area 50 into the enlarged area 53 with a portion of the lubricant being taken off by the port 57 for adequate lubrication of the rotor bearings of the pump as previously described. Lubricant pressure is active within the sleeve 73 to seal the shaft 37 against any leakage of air therealong into the pump. Preferably the selection of the design of the spiral pumping vane 52 of the rotor 51 will be such that lubricant pressure applied along the shaft portion 74 will be at least slightly greater than atmospheric pressure or the pressure against which it seals. The outer radially acting seal 90 will generally function to prevent any loss of lubricant outwardly of the pump. However, the more important consideration is to provide adequate lubricant pressure to prevent air leakage along the shaft into the vacuum pump and slight lubricant loss along the shaft portion 74 can be considered acceptable under the circumstances.

The standpipe assembly 56 through the port 79 will provide a constant head of lubricant within the sleeve 73 immediately surrounding the shaft portion 74 augmented by the pressure of lubricant moved by the pump rotor 51. The bearing 89 will be adequately lubricated and the pressure supplied by the pump rotor 51 will also function to relieve the sealing pressure of the end face sealing unit. In this respect the compression spring 86 is arranged to expand in a direction toward the pump rotor 51 thus urging the sealing ring 82 in tight running end face engagement with the mating ring 80. The opposed lubricant pressure established by the pump rotor 51 during operation of the shaft 37 will function to at least partially counterbalance the compressive action of the spring 86 and thus relieve the force applied at the engaging faces of the rings 80 and 82. A relieving of this force reduces the amount of frictional heat developed and minimizes lubricant decomposition or sealing element material decomposition. Such decomposition can result in a hydrogen gas by-product which cannot as efficiently be handled by the vacuum pump 10. Thus the sealing pressure relieving function of the lubricant pumping arrangement aids in the prevention of formation of decomposition gases which might interfere with efficient vacuum pump operation. Of course, the sealing unit pressure relieving function described also adds materially to the life of the sealing units.

The static pressure head supplied by the standpipe assembly 56 in the particular location described functions to maintain a static seal against leakage of atmospheric pressure into the vacuum pump when the pump is not in operation. For various reasons it is possible that the vacuum pump 10 might be rendered inoperative before completing evacuation of the system connected thereto. During any temporary shut-down of the vacuum pump 10, the shaft 37 of course is inoperative thus rendering the pump rotor 51 inoperative in maintaining a complete seal against atmospheric leakage. The static pressure head supplied by the standpipe assembly is selected so that it is capable of preventing atmospheric leakage when the pump is inoperative. This prevents loss of residual vacuum in the pump during such periods of shut-odwn.

The particular location of the standpipe assembly 56 is also advantageous in the event of sealing unit failure and loss of lubricant from the standpipe assembly. If this should occur during operation of the vacuum pump 10, the pumping sealing action of the pump rotor 51 is quite adequate to prevent loss of vacuum within the vacuum pump 10. The external accessability of the standpipe assembly permits ready noticing of loss of lubricant therefrom due to seal failure and immediate action can be taken to remedy the situation to assure the reestablishing of an adequate static seal when the vacuum pump is ultimately shut down.

Obviously certain modifications and variations of the invention as hereinbefore set forth may be made without departing from the spirit and scope thereof, and therefore only such limitations should be imposed as are indicated in the appended claims.

I claim:

1. In a vacuum pump provided with a housing, said housing defining an internal cavity, gas intake and discharge means forming a part of said housing and in communication with a cavity thereof, gas moving means in said cavity to move gas therethrough from said intake means to said discharge means, shaft means rotatably driving said gas moving means in said cavity, at least one end portion of said shaft means exposed externally of said housing, journal means supporting said shaft means in spaced portions of said housing, and shaft sealing means cooperating with one of said journal means through which said one end portion of said shaft means extends, said sealing means being arranged to prevent higher external pressure leakage into said cavity along said shaft means, the improvement comprising the provision of lubricant supply sump means in said cavity adjacent said shaft means and said sealing means, lubricant pumping means on said shaft means for operation therewith to pump lubricant axially to said sealing means to assist said sealing means in preventing leakage inwardly along said shaft means, means communicating said sump means with said pumping means to supply lubricant to said pumping means, and passage means communicating with said shaft means between said pumping means and said sealing means and communicating with the other of said journal means spaced from said one journal means to deliver lubricant to said other journal means under pressure developed by said pumping means.

2. The pump of claim 1 wherein separate lubricant containing static pressure head means is carried by said housing and is in communication with said shaft means within said housing between said pumping means and sealing means to maintain lubricant sealing pressure to assist said sealing means during non-operation of said pump.

3. The pump of claim 1 wherein said shaft means is located below said gas moving means in said pump and is connected thereto through gearing means to operate said gas moving means, said sump means including portions above and below said shaft means, and means movable with said gearing means and operative between said portions of said pump means to supply lubricant above said shaft means for gravity induced feed thereof to said pumping means.

4. In a vacuum pump provided with a housing, said housing defining an internal cavity, gas intake and discharge means forming a part of said housing and in communication with the cavity thereof, gas moving means in said cavity to move gas therethrough from said intake means to said discharge means, shaft means rotatably driving said gas moving means in said cavity, at least one end portion of said shaft means exposed externally of said housing, journal means supporting said shaft means in spaced portions of said housing, and shaft sealing means cooperating with one of said journal means through which said one end portion of said shaft means extends, said sealing means being arranged to prevent higher external pressure leakage into said cavity along said shaft means, the improvement comprising the provision of lubricant supply sump means in said cavity and surrounding said shaft means above and below the same adjacent said sealing means, lubricant pumping means on said shaft means for operation therewith to pump lubricant axially to said sealing means to assist said sealing means in preventing leakage inwardly along said shaft means, means communicating said sump means with said pumping means to supply lubricant to said pumping means, passage means communicating with said shaft means between said pumping means and said sealing means and communicating with the other of said journal means spaced from said one journal means to deliver lubricant to said other journal means under pressure developed by said pumping means, said sump means including an open top portion into which lubricant is delivered, said passage means further being in communication with said cavity to deliver lubricant from said other journal means into said cavity, and lubricant lifting means forming a part of said gas moving means to deliver lubricant from said cavity into said sump means through the open top portion thereof.

5. The pump of claim 4 wherein separate lubricant containing static pressure head means is carried by said housing and is in communication with said shaft means within said housing between said pumping means and sealing means to maintain lubricant sealing pressure to assist said sealing means during non-operation of said pump.

References Cited by the Examiner

UNITED STATES PATENTS

| 1,930,198 | 9/26 | Brown | 103—111 |
| 2,844,418 | 7/58 | Audemar | 230—204 X |
| 3,062,554 | 11/62 | McGahan et al. | 277—3 |

FOREIGN PATENTS 743,812  1/44  Germany.

LAURENCE V. EFNER, *Primary Examiner.*

ROBERT M. WALKER, *Examiner.*